United States Patent
Koro et al.

(10) Patent No.: US 6,811,295 B2
(45) Date of Patent: Nov. 2, 2004

(54) BATCH MIXER AND A MIXING ROTOR FOR THE SAME

(75) Inventors: Akio Koro, Kobe (JP); Yajun Zhang, Kobe (JP); Takuzo Iwata, Kobe (JP); Toru Nishikawa, Kobe (JP); Kimio Inoue, Kobe (JP); Norifumi Yamada, Takasago (JP); Ko Takakura, Takasago (JP)

(73) Assignees: Kabushiki Kaisha Kobe Seiko Sho, Kobe (JP); Sumitomo Rubber Industries Limited, Kobe (JP)

( * ) Notice: Subject to any disclaimer, the term of this patent is extended or adjusted under 35 U.S.C. 154(b) by 86 days.

(21) Appl. No.: 09/841,593

(22) Filed: Apr. 25, 2001

(65) Prior Publication Data

US 2001/0036123 A1 Nov. 1, 2001

(30) Foreign Application Priority Data

Apr. 26, 2000 (JP) ........................... 2000-126148

(51) Int. Cl.$^7$ ................................. B29B 7/18
(52) U.S. Cl. ..................... 366/97; 366/84; 366/88; 366/300; 366/321; 366/323
(58) Field of Search ............... 366/79, 81–86, 366/88, 97–99, 297–301, 318, 321–323, 76.7; 425/204, 207–209

(56) References Cited

U.S. PATENT DOCUMENTS

| | | | |
|---|---|---|---|
| 1,406,656 A | | 2/1922 | Lohmann |
| 2,496,625 A | * | 2/1950 | Henning |
| 4,456,381 A | | 6/1984 | Inoue et al. |
| 4,744,668 A | * | 5/1988 | Nortey |
| 2001/0050880 A1 | * | 12/2001 | Regalia |

FOREIGN PATENT DOCUMENTS

| | | | |
|---|---|---|---|
| CA | 2290923 | * | 5/2000 |
| EP | 1 033 217 | * | 9/2000 |
| WO | WO 99/49960 | | 10/1999 |

* cited by examiner

Primary Examiner—David Sorkin
(74) Attorney, Agent, or Firm—Oblon, Spivak, McClelland, Maier & Neustadt, P.C.

(57) ABSTRACT

Each mixing rotor for a batch mixer is rotatably insertable into a mixing chamber such that tip clearances are defined between tips of mixing blades and an inner surface of a mixing chamber and is provided on its outer circumferential surface with a plurality of mixing blades for imparting shearing forces to a material to be mixed by causing the material to pass through the tip clearances. The plurality of mixing blades include a nonlinear blade which is substantially nonlinear from a start point to a terminal point in a development of the mixing rotor developed into a plane about its longitudinal axis, and other linear blades which are linear in the development and whose helix angle to the longitudinal axis of the mixing rotor is set at 15 to 35°. An appropriate mixing control capable of realizing both sufficient mixing and sufficient dispersion can be executed by mixing and dispersing the material in a well-balanced manner by means of the mixing rotor.

20 Claims, 4 Drawing Sheets

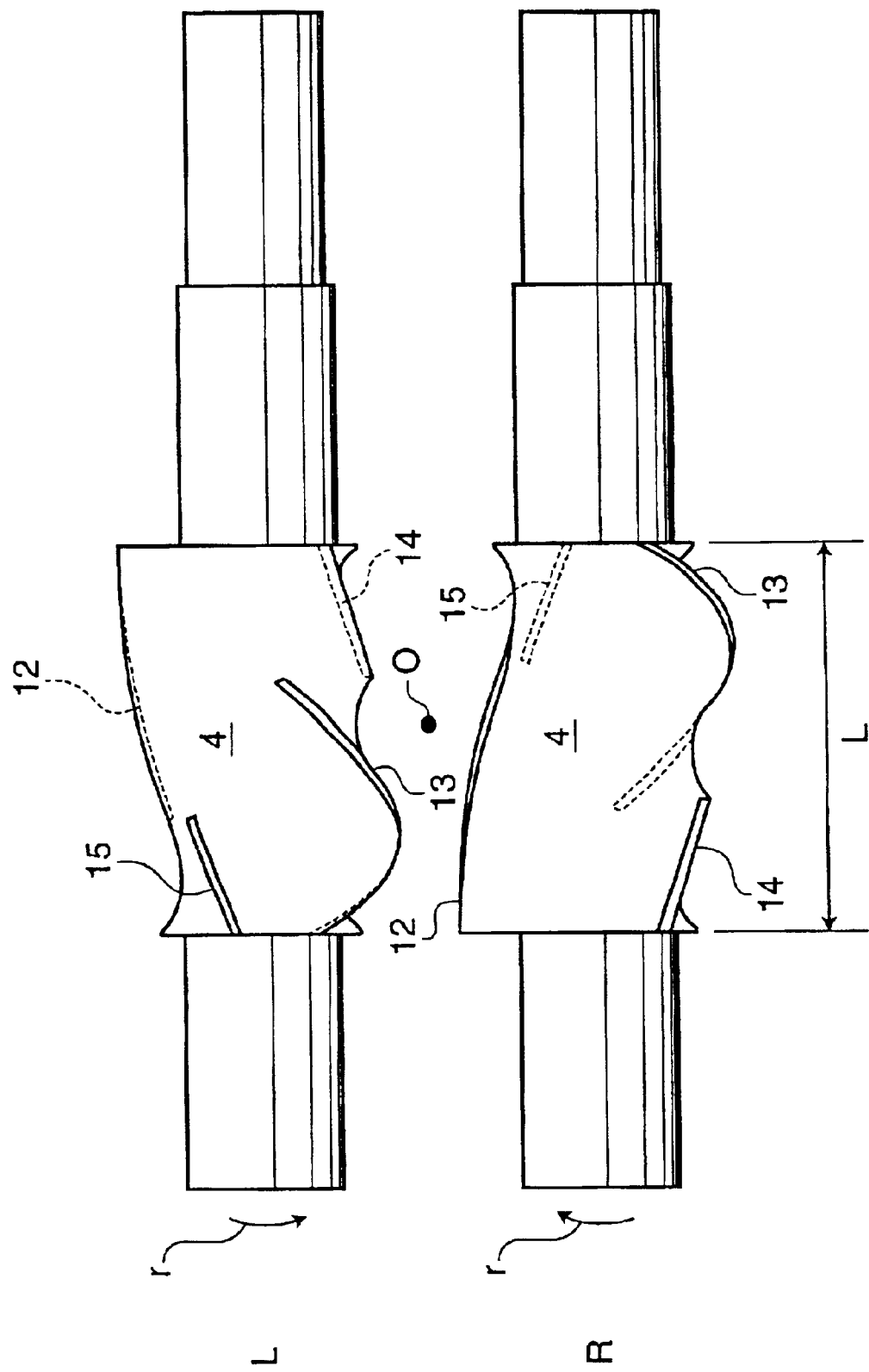

LEFT ROTOR

RIGHT ROTOR

RIGHT ROTOR

LEFT ROTOR

BATCH MIXER AND A MIXING ROTOR FOR THE SAME

BACKGROUND OF THE INVENTION

This invention relates to a mixing rotor for mixing polymeric materials such as plastic materials and rubbers, and a mixer having such a rotor.

A closed batch mixer suitable for kneading rubber has been known as a mixer of this type, for example, in Japanese Examined Patent Publication No. 58-4567. This mixer is designed to plasticize and melt a material to be mixed such as a plastic material or rubber by applying a strong shearing action to the material to be mixed by means of a pair of right and left rotors rotating in different directions in a mixing chamber. By efficiently mixing and dispersing various fillers and additives into the material to be mixed, plastic and rubber products of various qualities can be produced.

FIGS. 4A to 4C show mixing rotors used in such a mixer. Each mixing rotor 4 is provided on its outer circumferential surface with longer blades 22 and shorter blades 23 for allowing a material to be mixed to pass through tip clearances between the tips of the blades 22, 23 and the inner surface of a mixing chamber and imparting shearing forces thereto.

For creating axial material flows 24, 24' within the mixing chamber and thereby enhancing the degree of mixing of the material to be mixed, the longer and shorter blades 22, 23 are axially separated from each other, located at circumferentially displaced positions, and twisted in opposite directions.

In the conventional mixing rotor 4 as above, the respective blades 22, 23 are all linear in a development of the mixing rotor 4 developed into a plane about its longitudinal axis, and helix angles θ thereof are all the same. In other words, the helix angle θ of each blade 22, 23 is constant in the range from a start point P to a terminal point Q. In FIG. 4, the letter "r" denotes a rotational direction of the mixing rotor. Similarly, the letter "r" denotes a rotational direction of a mixing rotor in the drawings showing an embodiment to be described later.

By increasing the helix angles θ of the blades 22, 23 to the axial direction, an axial feed capacity is improved to thereby enhance the degree of mixing of the material to be mixed. Conversely, by decreasing the helix angles θ, a passage quantity of the material to be mixed through the tip clearances (hereinafter referred to as "material passage quantity") increases to thereby enhance the degree of dispersion of the material to be mixed.

However, since the helix angle of each blade 22, 23 is constant in the range from the start point P to the terminal point Q, it has been difficult to balance the degree of mixing and the degree of dispersion of the material to be mixed. This has resulted in difficulty to execute an appropriate control for securing well-balanced mixing and dispersion of the material to be mixed.

For example, if the helix angle θ is increased in the mixing rotor 4 for the batch mixer shown in FIG. 4 with the longer and shorter blades 22, 23 left linear in the development, the axial flows 24, 24' of the material to be mixed become larger, making it possible to enhance the degree of mixing. In such a case, the material passage quantity through the tip clearances of the respective blades 22, 23 decreases, resulting in a reduced degree of dispersion.

Conversely, if the helix angle θ is decreased with the longer and shorter blades left linear in the development, the material passage quantity through the tip clearances of the respective blades 22, 23 increases, making it possible to enhance the degree of dispersion. However, in such a case, the axial flows 24, 24' of the material to be mixed become smaller, resulting in a reduced degree of mixing.

SUMMARY OF THE INVENTION

It is an object of the present invention to provide a batch mixer and a mixing rotor which are free from the problems residing in the prior art.

It is another object of the present invention to provide an appropriate mixing control capable of realizing both sufficient mixing and sufficient dispersion of a material to be mixed by efficiently balancing mixing and dispersion of the material by means of mixing rotors.

According to an aspect of the present invention, a batch mixer is rotatably provided with a mixing rotor in a mixing chamber of the mixer. The mixing rotor comprises a plurality of mixing blades, each mixing blade defining a tip clearance between a tip of the mixing blade and an inner surface of the mixing chamber. The mixing blade imparts shearing forces to a material to be mixed in the tip clearance. The plurality of mixing blades includes a nonlinear blade which is substantially nonlinear from a start point to a terminal point in a development of the mixing rotor developed into a plane about its longitudinal axis, and other linear blades which is linear in the development.

These and other objects, features and advantages of the present invention will become more apparent upon a reading of the following detailed description and accompanying drawings.

BRIEF DESCRIPTION OF THE DRAWINGS

FIG. 1 is a plan view showing a pair of right and left mixing rotors for a batch mixer according to an embodiment of the invention;

DETAILED DESCRIPTION OF THE PREFERRED EMBODIMENT OF THE INVENTION

Figure 3:
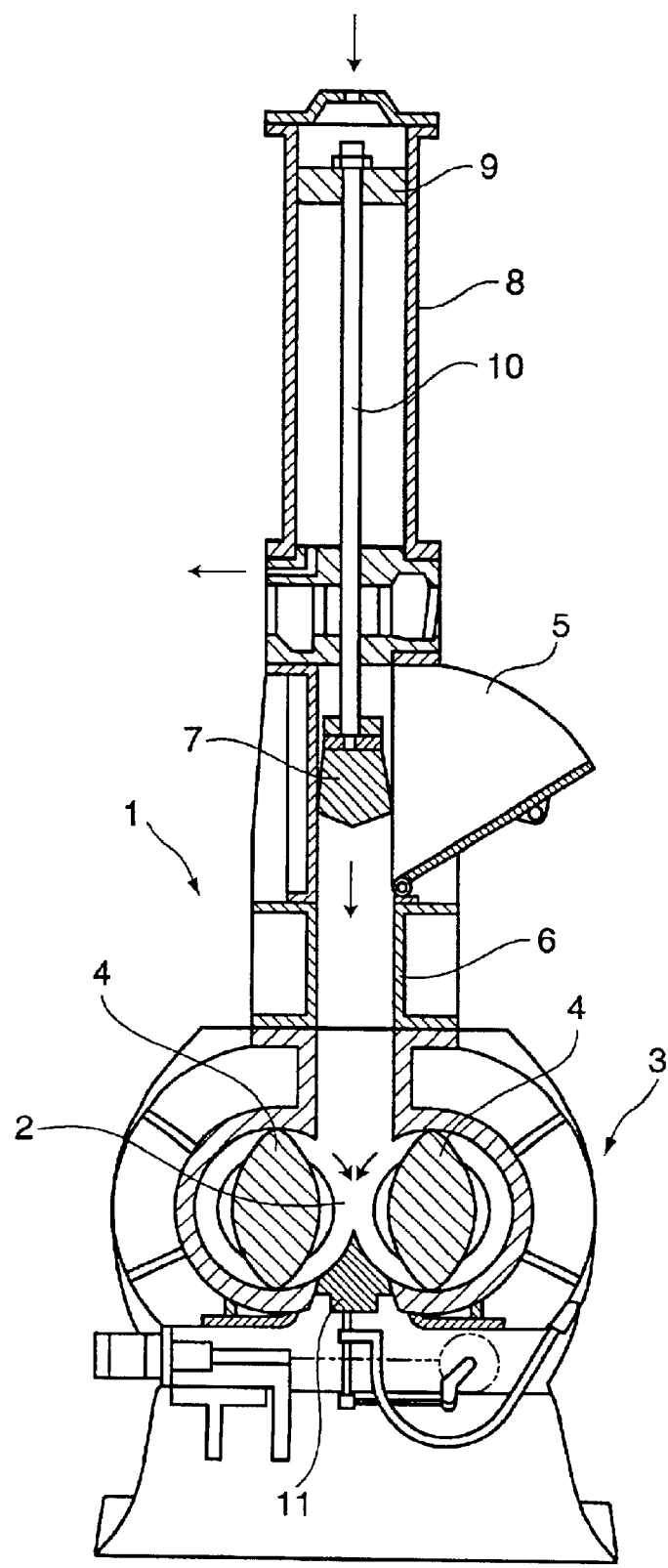
FIG. 3 is a front view in section of a batch mixer according to the embodiment of the invention.

Referring to FIG. 3 showing a closed batch mixer 1 embodying the invention, a mixer 1 is provided with a chamber 3 having a mixing chamber 2 which is in the shape of spectacles' holes in section, a pair of right and left mixing rotors 4 rotatably inserted into the mixing chamber 2, a material feed cylinder 6 erected on an upper opening of the chamber 3 and equipped with a hopper 5, and a floating weight 7 vertically movably inserted into the feed cylinder 6.

A pneumatic cylinder 8 is connected to the top of the material feed cylinder 6, and a piston 9 installed in the cylinder 8 is connected to the floating weight 7 through a piston rod 10 which extends through a lower lid of the cylinder 8 in an airtight manner. Thus, by pressing an upper portion of the pneumatic cylinder 8 and thereby moving the floating weight 7 down, a material to be mixed fed from the hopper 5 and present within the material feed cylinder 6 is forced into the chamber 3.

A discharge port formed at the bottom of the chamber 3 is closed by a drop door 11 which is made movable to open and close by a rotary actuator. By opening the drop door 11, the material having been mixed in the mixing chamber 2 for only a predetermined time can be discharged to the outside of the mixer 1.

Figure 2A:
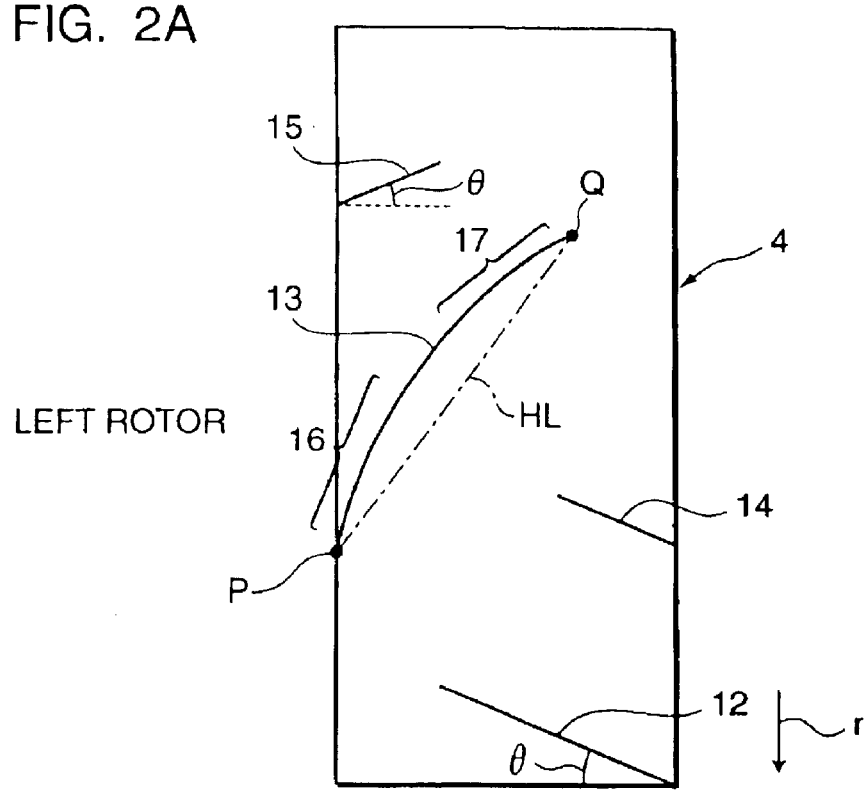
FIGS. 2A and 2B are diagrams showing respective developments of the right and left mixing rotor about their longitudinal axes.
Figure 2B:
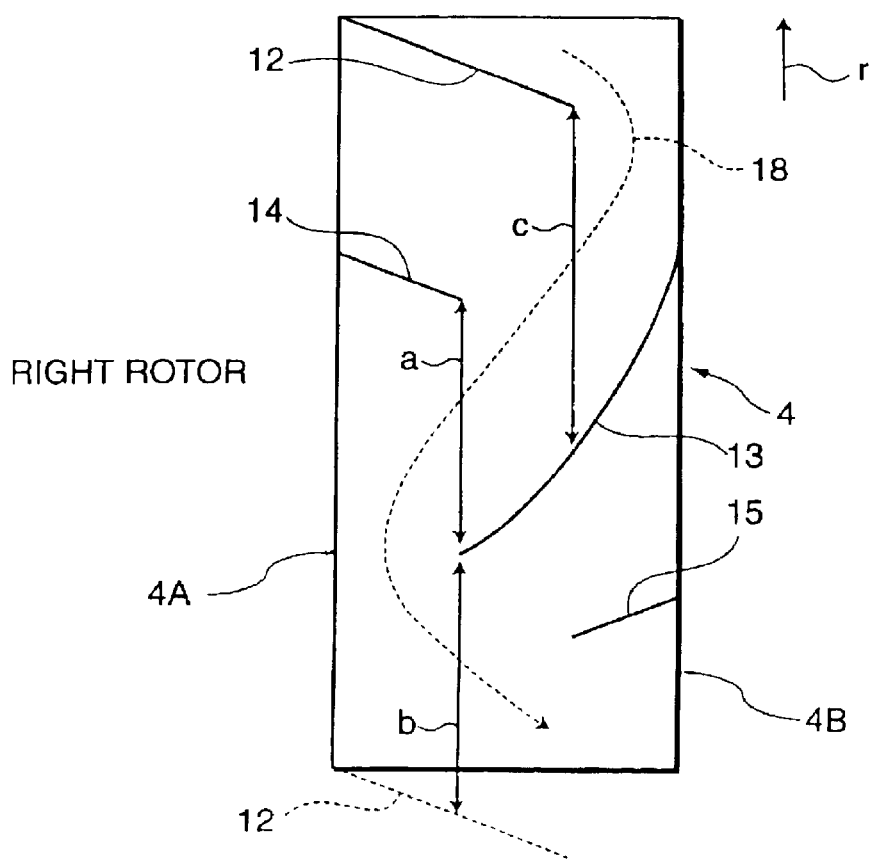

FIG. 1 is a plan view showing a pair of right and left mixing rotors 4, and FIGS. 2A and 2B are developments of the right and left mixing rotors about their longitudinal axes, respectively. The mixing rotors 4 used in this embodiment are rotated in opposite directions (directions of arrows "r" in FIGS. 1 and 2) so that opposing inner portions thereof shift downward. Each rotor 4 is provided with a plurality of mixing blades for causing a material to be mixed to pass through tip clearances between the tips of the mixing blades and the inner surface of the mixing chamber 2 and thereby imparting shearing forces to the material.

The mixing blades of this embodiment include a pair of longer blades 12, 13 which are longer than half the length L of the mixing rotor 4 and a pair of shorter blades 14, 15 which are shorter than that. For creating an axial material flow 18 to enhance the degree of mixing of the material to be mixed, the longer blades 12, 13 and the shorter blades 14, 15 are separated from each other in the longitudinal direction, located at circumferentially displaced positions, and the pair of longer blades 12, 13 and the pair of shorter blades 14, 15 are twisted in opposite directions, respectively.

In the right and left mixing rotors 4, the arrangement of the respective blades 12 to 15 is reversed with respect to forward and backward directions, i.e., the blades 12 to 15 are symmetrical with respect to a center point 0. Further, since each rotor 4 of this embodiment has two tips in section and has a total of four blades, the respective blades 12 to 15 are located at positions displaced from each other only by about a quarter of a circumference.

The shorter blades 14, 15 can be set to have a length of about 0.1 to 0.5 times that of the longer blades 12, 13. In the shown rotor, the longitudinal dimension of the first longer blade 12 is set at 0.7L (L: length of the mixing rotor), whereas that of the second longer blade 12 is set at 0.65L. Further, the longitudinal dimension of the first shorter blade 14 is set at 0.35L, whereas that of the second shorter blade 15 is set at 0.3L.

As shown in FIGS. 2A and 2B, the first longer blade 12, the first and second shorter blades 14, 15 are usual linear blades which are linear in the development of the mixing rotor 4 about the longitudinal axis, and these linear blades are set such that their helix angles θ to the axis of the mixing rotor 4 are 15 to 35°. In the shown rotor, θ is set at 22°.

Contrary to this, the second longer blade 13 is a nonlinear blade which is substantially nonlinear from the start point P to the terminal point Q in the development of the mixing rotor 4 about its longitudinal axis. The second longer blade 13 of this embodiment is so formed as to be curved, i.e., nonlinear from the start point P to the terminal point Q in the development by continuously changing the helix angle θ to gradually decrease from the start point P located at a longitudinal end side of the mixing rotor 4 toward the terminal point Q located at a longitudinal middle side of the mixing rotor 4.

Specifically, as shown in FIG. 2A, a section 16 of the second longer blade 13 at its start point side has an angle of inclination larger than that of a phantom straight line HL connecting the start point P and the terminal point Q, whereas a section 17 thereof at its terminal point side has an angle of inclination smaller than that of the phantom straight line HL.

Thus, the helix angle is larger at the section 16 of the second longer blade 13 as compared to the linear blade having a developed shape corresponding to the phantom straight line HL. Therefore, a larger and stronger material flow 18 can be created at the section 16 as compared to the case of the linear blade, with the result that the material to be mixed can be mixed to an enhanced degree.

On the other hand, the helix angle is smaller at the section 17 of the second longer blade 13 as compared to the linear blade having a developed shape corresponding to the phantom straight line HL. Therefore, a larger quantity of the material is allowed to pass through the tip clearance corresponding to the section 17 as compared to the case of the linear blade, with the result that the material to be mixed can be dispersed to an enhanced degree.

As shown in FIGS. 2A and 2B, in the mixing rotor 4 of this embodiment, the first longer blade 12 is a linear blade linearly extending from one longitudinal edge 4A of the mixing rotor 4 toward the longitudinal middle side of the mixing rotor 4, whereas the second longer blades 13 is a nonlinear blade which extends from the other longitudinal edge 4B of the mixing rotor 4 toward the longitudinal middle side of the mixing rotor 4 and whose helix angle gradually increases toward the other longitudinal end.

The first shorter blade 14 is a linear blade which is arranged behind the first longer blade 12 with respect to the rotational direction of the mixing rotor 4, twisted in the same direction as the first longer blade 12, and extends from the one longitudinal end of the mixing rotor 4 toward the longitudinal middle side of the mixing rotor 4. The second shorter blade 15 is a linear blade which is arranged behind the second longer blade 13 with respect to the rotational direction of the mixing rotor 4, twisted in the same direction as the second longer blade 13, and extends from the other longitudinal end of the mixing rotor 4 toward the longitudinal middle side of the mixing rotor 4.

Further, in this embodiment, the trailing end of the first longer blade 12 at the longitudinal middle side of the mixing rotor 4 is located at a position which is spaced apart from the second longer blade 13 by 120° or larger in the circumferential angle "c" of the mixing rotor 4, and the trailing end of the second longer blade 13 is located substantially in the middle between the trailing end of the first shorter blade 14 and the first longer blade 12 in the circumferential direction of the mixing rotor 4. In other words, the trailing end of the second longer blade 13 is set at such a circumferential position that circumferential angles "a" and "b" in FIG. 2B are substantially identical.

According to the mixing rotor 4 of this embodiment thus constructed, while a sufficient axial flow 18 of the material to be mixed is created to enhance the degree of mixing by the section 16 of the second longer blade 13 which is a nonlinear blade whose helix angle gradually increases toward the other longitudinal end, a sufficient shearing force is imparted to the material to be mixed to enhance the degree of dispersion by the first longer blade 12 which is a linear blade whose helix angle is set at 15° to 35°. Therefore, an appropriate mixing control capable of realizing both sufficient mixing and sufficient dispersion can be executed.

Further, since the terminal-point side section 17 of the second longer blade 13 acts to sufficiently disperse the material to be mixed, a sufficient dispersion performance can be secured by both the first and second longer blades 12, 13 at the longitudinal middle side of the mixing rotor 4.

Furthermore, since the material flow 18 toward the longitudinal middle side is enhanced by the start-point side section 16 of the second longer blade 13, this suppresses the material to be mixed being pressed against the longitudinal end surface of the mixing chamber 2, thereby providing an additional effect of improving a sealing performance of bearing portions between the chamber 3 and the mixing rotor 4.

In the mixing rotor 4 of this embodiment, the first shorter blade 14 is arranged behind the first longer blade 12 with respect to the rotational direction of the mixing rotor 4 while being twisted in the same direction as the first longer blade 12, and the second shorter blade 15 is arranged behind the second longer blade 13 with respect to the rotational direction of the mixing rotor 4 while being twisted in the same direction as the second longer blade 13. Accordingly, the material flown to the back side of the first longer blade 12 can be pushed back toward the longitudinal middle side of the mixing rotor 4 by the first shorter blade 14, and the material flown to the back side of the second longer blade 13 can be pushed back toward the longitudinal middle side of the mixing rotor 4 by the second shorter blade 15.

Thus, the material to be mixed is prevented from staying at the longitudinal ends of the mixing rotor, leading to an improved mixing performance, and shearing forces can be securely imparted to the material flown to the back sides of the respective longer blades 12, 13 by the respective shorter blades 14, 15, leading to an improved dispersion performance.

Further, in the mixing rotor 4 of this embodiment, a sufficiently large space is provided before the second longer blade 13 with respect to the rotational direction of the mixing rotor 4 by locating the trailing end of the first longer blade 12 at a position circumferentially spaced apart from the second longer blade 13 by 120° or larger, and a sufficiently large space is provide before the first longer blade 12 with respect to the rotational direction of the mixing rotor 4 by locating the trailing end of the second longer blade 13 substantially in the middle between the trailing end of the first shorter blade 14 and the first longer blade 12 in the circumferential direction of the mixing rotor 4. Therefore, the axial flow of material to be mixed becomes active, resulting in an improved mixing performance.

Figure 4A:
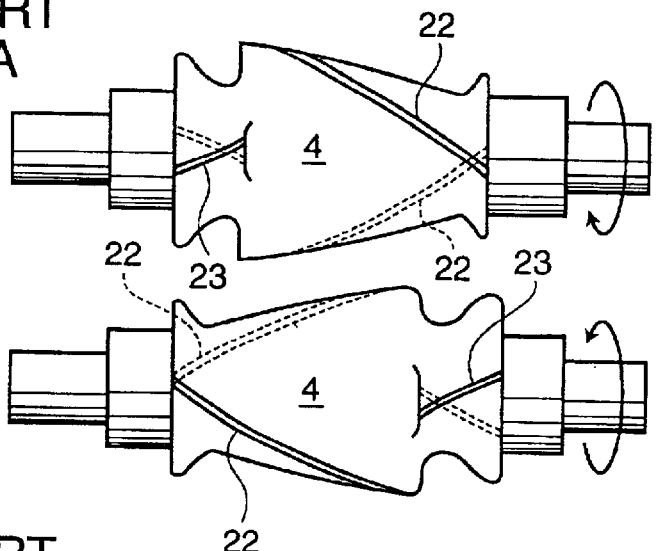
FIG. 4A is a plan view showing a pair of right and left mixing rotors of a conventional batch mixer.
Figure 4B:
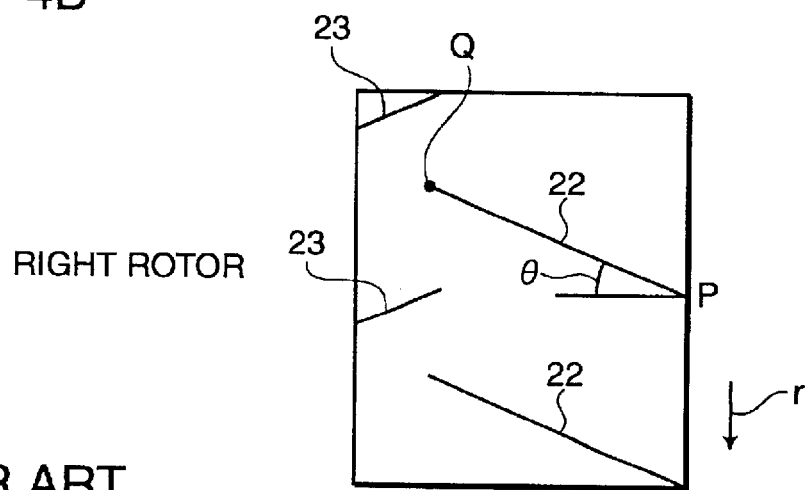
FIGS. 4B and 4C are diagrams showing respective developments of the conventional right and left mixing rotors about their longitudinal axes.
Figure 4C:
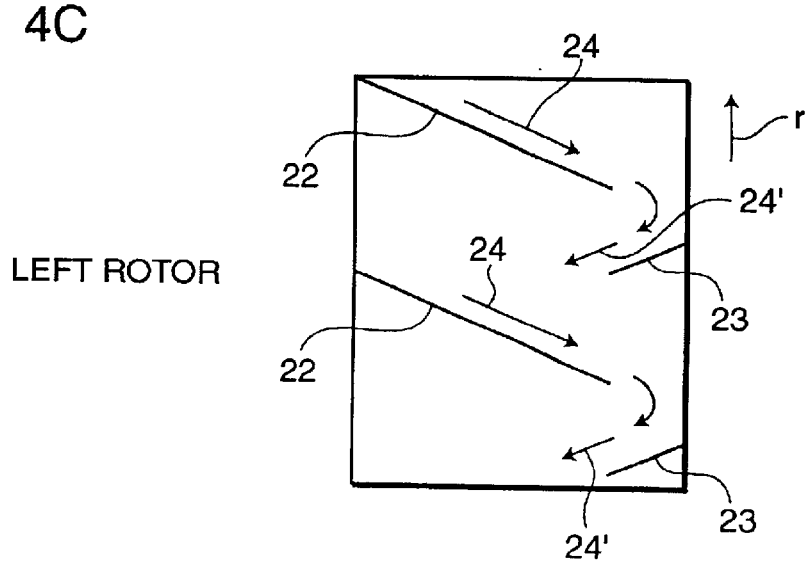

The conventional mixing rotors shown in FIG. 4 and the inventive mixing rotors shown in FIG. 1 were driven under the same conditions and differences in performance between the two different mixing rotors were checked by an experiment.

The result of the experiment showed that, as compared to the conventional mixing rotors (FIG. 4), the dispersion performance of the inventive mixing rotors (FIG. 1) was improved by about 10 percent, the energy consumption thereof was reduced by about 5 percent, and the discharge temperature of the mixed material was reduced by about 10° C. when the inventive mixing rotors were used.

Further, blue powder was added to white rubber and mixed states by the two kinds of rotors was checked under the same conditions. With the conventional mixing rotors, the blue powder was not entirely mixed into the rubber, thereby leaving lots of white rubber portions. Contrary to this, with the inventive mixing rotors, the blue powder was entirely mixed into the rubber and, therefore, white rubber portions were hardly found.

Although the invention has been described with respect to the foregoing embodiment, this embodiment is merely illustrative, but not restrictive. The technical scope of the invention is determined by claims, and all modes conceivable from the claims are embraced by the scope of the present invention.

For example, the number of the mixing blades of the mixing rotor in its circumferential direction is not limited to two, but may be three or more, and three or more kinds of mixing blades may be separately arranged in longitudinal direction. Further, the present invention is also applicable to meshing mixing rotor, tangent mixing rotor or uniaxial mixing rotor.

Although the helix angle of the nonlinear blade (second longer blade 13) continuously varies in any position with respect to the longitudinal direction (i.e., the developed shape is curved) in the foregoing embodiment, the helix angle may discontinuously vary provided that the developed shape of the blade from the start point to the terminal point is recognized to be substantially nonlinear.

Specifically, the "substantially nonlinear" referred in the present invention means that a developed shape of a single blade having a start point and a terminal point is slightly circumferentially deviated from a straight line connecting the start and terminal points, i.e., a shortest path between the two points, and the deviated path may be curved or bent.

The material to be mixed can be mixed and dispersed in a well-balanced manner by means of the mixing rotors by providing the nonlinear blades in addition to the usual linear blades. Therefore, an appropriate mixing control capable of realizing both sufficient mixing and sufficient dispersion can be executed.

As described above, a plurality of mixing blades formed on a mixing rotor include a nonlinear blade which is substantially nonlinear from a start point to a terminal point in a development of the mixing rotor developed into a plane about its longitudinal axis, and other linear blades which is linear in the development.

The nonlinear blade which is substantially nonlinear in the development is provided in addition to the linear blades whose helix angle is set within the above range. Since such a nonlinear blade is substantially nonlinear from the start point to the terminal point in the development, the shape thereof can be set such that the helix angle is increased at a certain section to increase the axial flow of the material while being decreased at the other section to enhance the degree of dispersion.

By combining such a nonlinear blade with the usual linear blades, mixing and dispersion of the material to be mixed can be more efficiently balanced as compared to the mixing rotor having only linear blades.

The mixing rotor for a batch mixer normally includes a pair of longer blades which are twisted in such a direction as to cause the material to flow toward a longitudinal middle side of the mixing rotor and are longer than half the length of the mixing rotor. In the case of such a mixing rotor, the pair of longer blades may include a first longer blade which is a linear blade extending from one longitudinal end of the mixing rotor toward the longitudinal middle side thereof, and a second longer blade which is a nonlinear blade which extends from the other longitudinal end of the mixing rotor toward the longitudinal middle side thereof and whose helix angle gradually increases toward the other longitudinal end.

In such a case, sufficient shearing forces are imparted to the material to enhance the degree of dispersion by the linear blades, while the axial flow of the material is sufficiently created at the other longitudinal end of the mixing rotor by the second longer blade which is a nonlinear blade whose helix angle gradually increases toward the other longitudinal end. Therefore, an appropriate mixing control capable of realizing both sufficient mixing and sufficient dispersion can be executed.

In this case, further, there is an additional effect of improving a sealing performance of bearing portions between the chamber and the mixing rotor since the helix angle of the second longer blade gradually increases toward the other longitudinal end.

The helix angles of the linear blades are preferably set at 15 to 35° from the following empirically obtained knowledge. In the case of a usual linear blade, a force for causing the axial flow of the material to be mixed is weakened if the helix angle is below 15°, with the result that an appropriate mixing performance cannot be obtained. If the helix angle exceeds 35°, a shearing force is weakened, with the result that an appropriate dispersion performance cannot be obtained.

In the case of providing a first shorter blade which is twisted in such a direction as to cause the material to flow toward the longitudinal middle side of the mixing rotor and is shorter than half the length of the mixing rotor, this first shorter blade is preferably a linear blade which is arranged behind the first longer blade with respect to a rotational direction of the mixing rotor, twisted in the same direction as the first longer blade, and extends from the one longitudinal end of the mixing rotor toward the longitudinal middle side thereof.

Further, in the case of providing a second shorter blade which is twisted in such a direction as to cause the material to flow toward the longitudinal middle side of the mixing rotor and is shorter than half the length of the mixing rotor, this second shorter blade is preferably a linear blade which is arranged behind the second longer blade with respect to the rotational direction of the mixing rotor, twisted in the same direction as the second longer blade and extends from the other longitudinal end of the mixing rotor toward the longitudinal middle side thereof.

In such a case, the material flown to the back side of the first longer blade can be pushed back toward the longitudinal middle side of the mixing rotor by the first shorter blade, whereas the material flown to the back side of the second longer blade can be pushed back toward the longitudinal middle side of the mixing rotor by the second shorter blade. Thus, the material is effectively prevented from staying at the longitudinal ends of the mixing rotor, leading to an improved mixing performance, and shearing forces can be securely imparted to the material flown to the back sides of the respective longer blades by the respective shorter blades, leading to an improved dispersion performance.

Further, if the leading end of the first longer blade at the longitudinal middle side of the mixing rotor is located at a position spaced apart from the second longer blade by 120° or larger in the circumferential direction of the mixing rotor and/or the leading end of the second longer blade at the longitudinal middle side of the mixing rotor is located substantially in the middle between the leading end of the first shorter blade at the same side and the first longer blade, sufficiently large spaces can be provided between the respective mixing blades, which causes the axial flow of the material to become active and, therefore, results in an improved mixing performance.

This application is based on patent application No. 2000-126148 filed in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A mixing rotor for use in a batch mixer including a mixing chamber, the mixing rotor comprising a plurality of mixing blades, each mixing blade having a tip for defining a tip clearance against an inner surface of the mixing chamber where the mixing rotor is to be rotatably placed to impart shearing forces to a material to be mixed in the tip clearance, wherein the plurality of mixing blades include a pair of longer blades twisted in such a direction as to cause the material to flow toward a longitudinal middle side of the mixing rotor, and the pair of longer blades include a first longer blade which is linear in a development of the mixing rotor developed into a plane about its longitudinal axis and extends from an edge of one longitudinal end of the mixing rotor toward the longitudinal middle side thereof to or beyond the longitudinal middle thereof and a second longer blade which is substantially nonlinear in the development and extends from an edge of the other longitudinal end of the mixing rotor toward the longitudinal middle side thereof beyond the longitudinal middle thereof and whose helix angle gradually increases toward the other longitudinal end.

2. A mixing rotor according to claim 1, wherein the helix angle of the linear blade to the longitudinal axis of the mixing rotor is 15 to 35°.

3. A mixing rotor according to claim 1, wherein the end of the first longer blade at the longitudinal middle side of the mixing rotor is located at a position spaced apart from the second longer blade by 124° or larger in the circumferential direction of the mixing rotor.

4. A mixing rotor for use in a batch mixer including a mixing chamber, the mixing rotor comprising a plurality of mixing blades, each mixing blade having a tip for defining a tip clearance against inner surface of the mixing chamber where the mixing rotor is to be rotatably placed to impart shearing forces to a material to be mixed in the tip clearance, wherein the plurality of mixing blades include a pair of longer blades twisted in such a direction as to cause the material to flow toward a longitudinal middle side of the mixing rotor, and the pair of longer blades include a first longer blade which is linear in a development of the mixing rotor developed into a plane about its longitudinal axis and extends from one longitudinal end of the mixing rotor toward the longitudinal middle side thereof, and a second longer blade which is substantially nonlinear in the development and extends from the other longitudinal end of the mixing rotor toward the longitudinal middle side thereof and whose helix angle gradually increases toward the other longitudinal end, wherein the mixing blades further include a first shorter blade twisted in such a direction as to cause the material to flow toward the longitudinal middle side of the mixing rotor, and the first shorter blade is linear and arranged behind the first longer blade with respect to a rotational direction of the mixing rotor and extends from the one longitudinal end of the mixing rotor toward the longitudinal middle side thereof.

5. A mixing rotor according to claim 4, wherein the end of the first longer blade at the longitudinal middle side of the mixing rotor is located at a position spaced apart from the second longer blade by 120° or larger in the circumferential direction of the mixing rotor.

6. A mixing rotor according to claim 4, wherein the end of the second longer blade at the longitudinal middle side of the mixing rotor is located substantially in the middle between the end of the first shorter blade at the same side and the first longer blade in the circumferential direction of the mixing rotor.

7. A mixing rotor according to claim 4, wherein the mixing blades include a second shorter blade twisted in such a direction as to cause the material to flow toward the longitudinal middle side of the mixing rotor, and the second shorter blade is linear and arranged behind the second longer blade with respect to the rotational direction of the mixing rotor and extends from the other longitudinal end of the mixing rotor toward the longitudinal middle side thereof.

8. A mixing rotor according to claim 7, wherein the end of the second longer blade at the longitudinal middle side of the mixing rotor is located substantially in the middle between the end of the first shorter blade at the same side and the first longer blade in the circumferential direction of the mixing rotor.

9. A mixing rotor according to claim 7, wherein the end of the first longer blade at the longitudinal middle side of the mixing rotor is located at a position spaced apart from the second longer blade by 120° or larger in the circumferential direction of the mixing rotor.

10. A mixing rotor according to claim 9, wherein the end of the second longer blade at the longitudinal middle side of the mixing rotor is located substantially in the middle between the end of the first shorter blade at the same side and the first longer blade in the circumferential direction the mixing rotor.

11. A batch mixer comprising:

a chamber including a mixing chamber; and a mixing rotor rotatably placed in the mixing chamber, and including a plurality of mixing blades, each mixing blade having a tip for defining a tip clearance against an inner surface of the mixing chamber to impart shearing forces to a material to be mixed in the tip clearance, wherein the plurality mixing blades include a pair of longer blades twisted in such a direction as to cause the material to flow toward a longitudinal middle side of the mixing rotor, and the pair of longer blades include a first longer blade which is linear in a development of the mixing rotor developed into a plane about its longitudinal axis and extends from an edge of one longitudinal end of the mixing rotor toward the longitudinal middle side thereof to or beyond the longitudinal middle thereof, and a second longer blade which is substantially nonlinear in the development and extends from an edge of the other longitudinal end of the mixing rotor toward the longitudinal middle side thereof beyond the longitudinal middle thereof and whose helix angle gradually increases toward the other longitudinal end.

12. A batch mixer according to claim 11, wherein the helix angle of the linear blade to the longitudinal axis of the mixing rotor is 15 to 35°.

13. A batch mixer according to claim 11, wherein the end of the first longer blade at the longitudinal middle side of the mixing rotor is located at a position spaced apart from the second longer blade by 120° or larger in the circumferential direction of the mixing rotor.

14. A batch mixer comprising:

a chamber including a mixing chamber; and a mixing rotor rotatably placed in the mixing chamber, and including a plurality of mixing blades, each mixing blade having a tip for defining a tip clearance against an inner surface of the mixing chamber where the mixing rotor is to be rotatably placed to impart shearing forces to a material to be mixed in the tip clearance, wherein the plurality of mixing blades include a pair of longer blades twisted in such a direction as to cause the material to flow toward a longitudinal middle side of the mixing rotor, and the pair of longer blades include a first longer blade which is linear in a development of the mixing rotor developed into a plane about its longitudinal axis and extends from one longitudinal end of the mixing rotor toward the longitudinal middle side thereof, and a second longer blade which is substantially nonlinear in the development and extends from the other longitudinal end of the mixing rotor toward the longitudinal middle side thereof and whose helix angle gradually increases toward the other longitudinal end, wherein the mixing blades further include a first shorter blade twisted in such a direction as to cause the material to flow toward the longitudinal middle side of the mixing rotor, and the first shorter blade is linear and arranged behind the first longer blade with respect to a rotational direction of the mixing rotor and extends from the one longitudinal end of the mixing rotor toward the longitudinal middle side thereof.

15. A batch mixer according to claim 14, wherein the end of the first longer blade at the longitudinal middle side of the mixing rotor is located at a position spaced apart from the second longer blade by 120° or larger in the circumferential direction of the mixing rotor.

16. A batch mixer according to claim 14, wherein the end of the second longer blade at the longitudinal middle side of the mixing rotor is located substantially in the middle between the end of the first shorter blade at the same side and the first longer blade in the circumferential direction of the mixing rotor.

17. A batch mixer according to claim 14, wherein the mixing blades include a second shorter blade twisted in such a direction as to cause the material to flow toward the longitudinal middle side of the mixing rotor, and the second shorter blade is linear and arranged behind the second longer blade with respect to the rotational direction of the mixing rotor and extends from the other longitudinal end of the mixing rotor toward the longitudinal middle side thereof.

18. A batch mixer according to claim 17, wherein the end of the second longer blade at the longitudinal middle side of the mixing rotor is located substantially in the middle between the end of the first shorter blade at the same side and the first longer blade in the circumferential direction of the mixing rotor.

19. A batch mixer according to claim 17, wherein the end of the first longer blade at the longitudinal middle side of the mixing rotor is located at a position spaced apart from the second longer blade by 120° or larger in the circumferential direction of the mixing rotor.

20. A batch mixer according to claim 19, wherein the end of the second longer blade at the longitudinal middle side of the mixing rotor is located substantially in the middle between the end of the first shorter blade at the same side and the first longer blade in the circumferential direction of the mixing rotor.

* * * * *